2,825,705

HYDROGENATION OF CARBON MONOXIDE TO NORMALLY SOLID, HIGH MOLECULAR WEIGHT, HYDROCARBON POLYMERS WITH REDUCED METAL PHOSPHOMOLYBDATE CATALYSTS

Herrick R. Arnold and Frank S. Fawcett, Wilmington, Del., and Benjamin W. Howk, West Chester, Pa., assignors to E. I. du Pont de Nemours and Company, Wilmington, Del., a corporation of Delaware No Drawing. Application July 16, 1953
Serial No. 368,488

14 Claims. (Cl. 260—2)

This invention relates to the preparation of high molecular weight essentially hydrocarbon products. More particularly, this invention relates to a novel catalytic process for preparing normally solid, high molecular weight, hydrocarbons from carbon monoxide and hydrogen.

It is known that in the presence of certain catalysts and under well defined conditions of temperature and pressure, carbon monoxide and hydrogen react to form methanol and branched chain higher alcohols. It is also known that under other conditions the reaction between carbon monoxide and hydrogen can be directed to produce hydrocarbons as the principal products of the reaction. Cobalt-containing, ruthenium-containing, and iron-containing catalysts are particularly well known for this reaction. The hydrocarbons obtained with these catalysts, however, are of relatively low molecular weight. Therefore, if the hydrogenation is to be carried out to produce high molecular weight hydrocarbon products, new processes employing more effective catalysts are required.

It is an object of this invention to provide a novel process for the preparation of high molecular weight essentially hydrocarbon products. A further object is to provide a novel catalytic process for preparing normally solid, high molecular weight, hydrocarbons from carbon monoxide and hydrogen. Other objects will appear hereinafter.

These and other objects of this invention are accomplished by the following process for preparing normally solid, high molecular weight, hydrocarbon polymers which comprises heating and reacting carbon monoxide with hydrogen at a temperature of 125° to 350° C. under a pressure of at least 200 atmospheres and in contact with a reduced metal phosphomolybdate which is the product obtained by reducing in hydrogen at atmospheric pressure and at a temperature in excess of 375° C. for at least six hours a phosphomolybdic acid salt of a metal of groups I-A, I-B, II-B, III-B, VII-A and the base metals of group VIII of the periodic table. It has now been found that if instead of using the previously known iron-, cobalt-, and ruthenium-containing catalysts, there is used a metal phosphomolybdate catalyst as herein specified which has been prereduced in accord with the procedure described in the concurrently filed U. S. patent application of Arnold and Howk, Serial No. 368,489, now U. S. Patent 2,788,258, issued April 9, 1957, the principal products of the reaction are high molecular weight hydrocarbons.

In producing the normally solid, high molecular weight, hydrocarbons in accord with this invention, a pressure reactor is charged with a liquid diluent and the reduced metal phosphomolybdate catalyst, the reactor is swept with oxygen-free nitrogen, cooled to 0° C., and evacuated. The reactor is then pressured to a specific level with a carbon monoxide/hydrogen gas mixture of predetermined composition and the reaction mixture is heated to between 125° and 350° C. until the desired degree of reaction has taken place. Throughout the reaction period the pressure within the reactor is maintained at the desired level by re-pressuring with a carbon monoxide/hydrogen gas mixture of the same or of different composition from that initially used. After reaction is complete, the reactor is permitted to cool, opened, the contents discharged, and filtered. The solid polymeric product is separated from the catalyst by extraction or by other means known to those skilled in the art.

The examples which follow are submitted to illustrate and not to limit this invention. Unless otherwise stated, the reactor employed is of approximately 400 cc. capacity, inherent viscosity refers to measurements made at 0.1% concentration in tetrahydronaphthalene at 125° C., and the gas composition is a 2:1 molar hydrogen-carbon monoxide mixture.

Example I

A mixture of 100 cc. of xylene and 10 g. of reduced nickel phosphomolybdate in powder form, prepared as described subsequently, is heated at 250° C. with a hydrogen-carbon monoxide gas mixture under 1000 atmospheres total gas pressure. During 15 hours the gas absorption amounts to 735 atmospheres. Extraction of the crude solid product with refluxing benzene, followed by dilution of the extract with methanol, yields 0.33 g. of solid precipitate. Similar extraction with xylene and precipitation yields 1.00 g. of a white hydrocarbon polymer having inherent viscosity 0.97.

The above experiment is repeated at 225° C. using a reduced nickel phosphomolybdate in the form of 8–14 mesh pellets. Under these conditions a gas absorption corresponding to 955 atmospheres is observed and there is obtained 3.47 g. of a xylene-soluble polymer having an inherent viscosity of 1.68.

The reduced nickel phosphomolybdate is prepared as follows:

A nickel salt of phospho-11-molybdic acid having the composition $Ni_2H_8[P_2(Mo_2O_7)_{11}] \cdot 24H_2O$ or

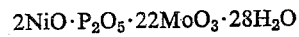

$$2NiO \cdot P_2O_5 \cdot 22MoO_3 \cdot 28H_2O$$

is prepared by dissolving 100 g. of phospho-11-molybdic acid and 43.6 g. of nickel nitrate hexahydrate in one liter of distilled water and concentrating the solution on a steam bath until incipient crystallization of the nickel salt occurs. The solution is then slowly cooled to room temperature, whereupon the nickel salt is crystallized. The crystals are isolated by filtration and dried in vacuo over phosphorus pentoxide.

Sixty-five grams (50 cc.) of the yellow crystalline nickel phospho-11-molybdate is placed in a heat-resistant glass tube mounted in an electric furnace, and hydrogen at the rate of 50 liters/hour, equivalent to a space velocity of 1000 reciprocal hours, is passed through the tube at essentially atmospheric pressure. The system is then heated up from room temperature to 400° C. at the rate of about 85–95° C./hr. and held under these conditions for 16.75 hours. During the heating up period in the temperature range 100–200° C. the water of crystallization is driven off, the nickel phosphomolybdate undergoing a simultaneous color change from yellow to orange. In the interval 200–300° C. no further water is formed and no significant change in appearance of the nickel phosphomolybdate occurs. At approximately 300° C. reduction is initiated, as indicated by the evolution of water, and a gradual change in color of the nickel salt occurs from orange to black. At 400° C. reduction proceeds more rapidly, however, and is continued at this temperature for a period of 16.75 hours. The reduced product is then cooled to room temperature in hydrogen, flushed at room temperature with nitrogen and discharged and sealed under nitrogen.

The reduced nickel phosphomolybdate is black and highly pyrophoric and has to be handled at all times in an inert atmosphere in order to avoid oxidation. Its X-ray diffraction pattern shows that it is essentially amorphous and its empirical formula, as indicated by elementary analysis, is $Ni_2 \cdot P_2O_2 \cdot (Mo_2O_5)_{11}$, as compared to $2NiO \cdot P_2O_5 \cdot 22MoO_3 \cdot 28H_2O$ for the unreduced nickel salt.

*Example II*

The procedure in the first part of Example I is repeated with a reduced powdered cobalt phosphomolybdate catalyst, prepared as described subsequently. Under these conditions the total pressure drop corresponds to 810 atmospheres. There is obtained 0.22 g. of benzene-soluble material and 1.12 g. of xylene-soluble polymer, the latter having inherent viscosity 1.89 and M. P. 128–130.5° C.

*Example III*

The procedure in the first part of Example I is repeated with 10 g. of a reduced powdered iron phosphomolybdate catalyst, prepared as described subsequently. After 9.5 hours at 240° C., there is obtained 0.18 g. of benzene-soluble product and 1.68 g. of xylene-soluble polymer, the latter having an inherent viscosity of 2.23 and M. P. 130–132.5° C.

*Example IV*

A mixture of 100 cc. of xylene and 10 g. of a reduced copper phosphomolybdate catalyst, prepared as described subsequently, is heated at 225° C. and pressured to 1000 atmospheres with a hydrogen-carbon monoxide mixture. During a period of 15 hours the gas absorption amounts to 205 atmospheres and extraction yields 0.20 g. of benzene-soluble product and 1.27 g. of xylene-soluble polymer. The latter has an inherent viscosity of 2.53, a M. P. of 130–134.5° C., and the following elemental composition:

Analysis.—Calc'd for $(CH_2)_x$: C, 85.70; H, 14.30. Found: C, 84.95; H, 14.29.

*Examle V*

The procedure in the first part of Example I is repeated with 10 g. of a reduced powdered zinc phosphomolybdate catalyst, prepared as described subsequently. Under these conditions the gas absorption amounts to 975 atmospheres. There is obtained 0.87 g. of benzene-soluble product and 2.09 g. of xylene-soluble polymer having an inherent viscosity 1.42 and M. P. 129–131° C.

*Example VI*

A mixture of 100 cc. of xylene and 10 g. of a reduced aluminum phosphomolybdate catalyst, prepared as described subsequently, is heated at 225° C. under a pressure of 1000 atmospheres of a hydrogen-carbon monoxide mixed gas. During 15 hours the gas absorption amounts to 180 atmospheres. There is obtained 0.50 g. of xylene-soluble polymer having inherent viscosity 2.44 and M. P. 129–132° C.

*Example VII*

A mixture of 100 cc. of xylene and 10 g. of a reduced silver phosphomolybdate catalyst, prepared as described subsequently, is heated at 225° C. and pressured to 1000 atmospheres with a hydrogen-carbon monoxide mixed gas mixture. During a period of 15 hours, a 420 atmospheres gas absorption occurs and there is obtained 1.57 g. of xylene-soluble hydrocarbon polymer.

*Example VIII*

A mixture of 100 cc. of xylene and 20.2 g. of a reduced powdered potassium phosphomolybdate catalyst, prepared as described subsequently, is heated at 275° C. and pressured to 1000 atmospheres with a hydrogen-carbon monoxide gas mixture. The gas absorption during a 15 hour reaction period amounts to 970 atmospheres. The crude product is separated into a solid portion and two liquid layers. Extraction of the solid with refluxing benzene gives 0.5 g. of solid product and subsequent extraction with refluxing xylene yields 2.63 g. of white solid polymer having an inherent viscosity of 1.31. The upper (less dense) liquid layer, after evaporation of the xylene solvent, yields 1.0 g. of wax.

The catalysts used in Examples II through VIII are prepared following the procedure described under Example I by substituting molar equivalents of the respective metal nitrates for nickel nitrate. Typical compositions of the metal salts prepared in this way and of the reduced products are tabulated below:

| Metal Phosphomolybdates | Reduced Metal Phosphomolybdates |
|---|---|
| $3CoO \cdot P_2O_5 \cdot 22MoO_3 \cdot 33H_2O$ | $Co_2 \cdot P_2O_5 \cdot (Mo_2O_5)_{11}$ |
| $3FeO \cdot P_2O_5 \cdot 22MoO_3 \cdot 56H_2O$ | $Fe_3 \cdot P_2O_5 \cdot (Mo_2O_5)_{10}$ |
| $3ZnO \cdot P_2O_5 \cdot 22MoO_3 \cdot 32H_2O$ | $Zn_3 \cdot P_2O_5 \cdot (Mo_2O_5)_{12}$ |
| $Al_2O_3 \cdot P_2O_5 \cdot 20MoO_3 \cdot 44H_2O$ | $Al_2 \cdot P_2O_5 \cdot (Mo_2O_5)_{11}$ |
| $3CuO \cdot P_2O_5 \cdot 22MoO_3 \cdot 43H_2O$ | $Cu_2 \cdot P_2O_5 \cdot (Mo_2O_5)_{12}$ |
| $5Ag_2O \cdot P_2O_5 \cdot 22MoO_3 \cdot 36H_2O$ | $Ag_{10} \cdot P_2O_5 \cdot (Mo_2O_5)_{11}$ |
| $2K_2O \cdot P_2O_5 \cdot 22MoO_3 \cdot XH_2O$ | $K_4 \cdot P_2O_5 \cdot (Mo_2O_5)_{12}$ |

The products obtained by reduction of the metal phosphomolybdates are all gray to black pyrophoric solids having surface areas in the range of 10 to 130 m.²/g. as determined by the procedure described in a paper by P. H. Emmett, entitled "A new method for measuring the surface areas of finely divided materials and for determining the size of particles," Am. Soc. for Testing Materials, March 4, 1941, Symposium on New Methods for Particle Size Determination in the Sub-sieve Range. Their X-ray diffraction patterns indicate that they are principally amorphous, like reduced nickel phosphomolybdate.

The examples have illustrated certain conditions of temperature, pressure, catalyst concentration, carbon monoxide/hydrogen mixed gas composition, etc. It is to be understood that these are interdependent variables and that modification in one set of conditions may require compensating adjustments in the others.

The process of this invention can be operated as a batch, as a semi-continuous, or as a continuous up-flow, down-flow, or counter-current operation. It can also be operated as a co-current flow or boiling bed operation.

The mole ratio of carbon monoxide to hydrogen in the gas mixture may vary from 10:1 to 1:5. Usually, mole ratios of from 3:1 to 1:2 are used because gas mixtures in this range of composition are ordinarily available in large scale and give optimum results from the standpoint of yield of desired high molecular weight hydrocarbons.

The temperature at which the hydrogenation of the carbon monoxide is effected lies in the range of 125° to 350° C. Because good reaction rates, with best yields of desired high molecular weight hydrocarbons, are obtained in the range 150° to 275° C., this range embraces the preferred operating temperature conditions.

The process is usually operated under a total pressure of at least 200 atmospheres. Because better yields of desired high molecular weight hydrocarbons, with maximum utilization of the carbon monoxide and hydrogen, are achieved by using pressures in excess of 400 atmospheres, the use of such pressures is economical and embraces a preferred mode of operation. The maximum pressure which is utilizable is dictated simply by the mechanical limitations of the equipment used. For practical reasons, pressures above 5000 atmospheres are generally not used and this therefore constitutes a practical upper pressure limit.

Because the reaction is highly exothermic, it is preferred to operate in the presence of a liquid reaction medium, which besides aiding in the dissipation of the heat of reaction also functions to bring about better catalyst contact, and hence improves the efficiency of the process. Suitable media are water, cyclohexane, methanol, decahydronaphthalene, tetrahydronaphthalene, benzene, toluene, xylene, cyclohexanone, methyl isobutyl ketone, and the like. The reaction medium can occupy up to 60% or as little as 5% of the reactor volume. Generally, however, in batch operation the reaction medium occupies between 30 and 50% of the reactor volume.

The time of reaction depends upon such interdependent variables as temperature, pressure, and amount and type of catalyst employed. Under preferred conditions for batch operation the reaction reaches essential completion in from 5 to 20 hours.

The catalysts used in the practice of this invention are those obtained by reducing a phosphomolybdic acid salt of one of the metals of groups I-A, I-B, II-B, III-B VII-A and the base metals of group VIII of the periodic table with hydrogen at atmospheric pressure and a space velocity of at least 500 reciprocal hours at a temperature in excess of 375° C. and below 500° C., ordinarily for at least six hours, as described and claimed in Arnold and Howk, U. S. patent application, Serial No. 368,489, now U. S. Patent 2,788,258, issued April 9, 1957, filed concurrently herewith.

The phosphomolybdic acid salts of the metals of the aforementioned groups used in preparing the reduced metal phosphomolybdate catalysts employed in the practice of this invention correspond to the formula $$M_yP_2Mo_{20-24}O_{68-82}$$

in which $y$ is an integer from 1 through 10, preferably 2 through 10, and M is a metal from groups I-A, I-B, II-B, III-B, VII-A and the base metals of group VIII of the periodic table, such as copper, silver gold, zinc, aluminum, mercury manganese, masurium, iron, nickel, cobalt, potassium and sodium.

The preferred reduced metal phosphomolybdates are comprehended by the formula $M_yP_2Mo_{20-26}O_{37-65}$, wherein M is a metal of groups I-A, I-B, II-B, III-B, VII-A and the base metals of group VIII of the periodic table, $y$ is an integer of from 1 through 10, preferably 2 through 10. The metals of these specified groups are listed in "Table VIII—The periodic series of the elements" on page 118 of "Mellor's Modern Inorganic Chemistry," revised and edited by Parkes, Longmans, Green and Co., New York, 1952, as follows: Group I-A, lithium, sodium, potassium, rubidium and caesium; Group I-B, copper, silver and gold; Group II-B, zinc, cadmium and mercury; Group III-B, aluminum, gallium and indium; Group VII-A, manganese and masurium; and the base metals of Group VIII, iron, cobalt and nickel.

Typical reduced metal phosphomolybdates are those where M is nickel, cobalt, iron, manganese, zinc, aluminum, copper, silver and potassium.

The composition of the reduced phosphomolybdic acid metal salt depends upon the temperature and time of reduction used within the preferred operating temperature of 400°–475° C. and a 16–25 hour reduction time. In the reduction, hydrogen alone, or hydrogen and diluent gas, e. g., nitrogen or carbon monoxide, is permitted to pass at atmospheric pressure over the heated phosphomolybdic acid. Usually the space velocity is between 500 and 1100 reciprocal hours because under these conditions good reduction rates, under the preferred temperature conditions, are realized.

The amount of catalyst used depends upon such interdependent variables as temperature, pressure, general method of operation, catalyst activity, etc. As a rule in batch operation it will be between 1.5 and 30% and preferably between 2.5 and 20% by weight of the reaction medium employed. In continuous operation, the weight of product in the reactor at any one time is ordinarily less than the weight of the catalyst, but the total weight of material processed during the active life of the catalyst is usually considerably more than the catalyst weight.

The surface of the reactor in contact with the reactants appears to be a factor in determining the molecular weight and yield of high molecular weight hydrocarbons obtained. Silver and stainless steel are satisfactory materials.

The process of this invention makes it possible to convert carbon monoxide to normally solid, high molecular weight hydrocarbons, having properties which make them outstandingly useful for conversion to films and fibers.

As many apparently widely different embodiments of this invention may be made without departing from the spirit and scope thereof, it is to be understood that this invention is not limited to the specific embodiments thereof except as defined in the appended claims.

We claim:

1. A process for preparing normally solid, high molecular weight, hydrocarbon polymers which comprises heating and reacting carbon monoxide with hydrogen at a temperature of 125° to 350° C. under a pressure of at least 200 atmospheres and in contact with a metal phosphomolybdate represented by the formula $$M_yP_2Mo_{20-26}O_{37-65}$$

wherein M is a metal selected from the class consisting of lithium, sodium, potassium, rubidium, caesium, copper, silver, gold, zinc, cadmium, mercury, aluminum, gallium, indium, manganese, masurium, iron, cobalt and nickel, and $y$ is an integer from 2 through 10.

2. A process for preparing normally solid, high molecular weight, hydrocarbon polymers which comprises heating and reacting carbon monoxide with hydrogen at a temperature of 150° to 275° C. under a pressure within the range of 400 to 5000 atmospheres and in contact with a metal phosphomolybdate represented by the formula $M_yP_2Mo_{20-26}O_{37-65}$, wherein M is a metal selected from the class consisting of lithium, sodium, potassium, rubidium, caesium, copper, silver, gold, zinc, cadmium, mercury, aluminum, gallium, indium, manganese, masurium, iron, cobalt and nickel, and $y$ is an integer from 2 through 10.

3. A process for preparing normally solid, high molecular weight, hydrocarbon polymers which comprises heating and reacting carbon monoxide with hydrogen at a temperature of 150° to 275° C. under a pressure within the range of 400 to 5000 atmospheres and in contact with a metal phosphomolybdate represented by the formula $M_yP_2Mo_{20-26}O_{37-65}$, wherein M is a base metal of group VIII of the periodic table and $y$ is an integer from 2 through 10.

4. A process for preparing normally solid, high molecular weight, hydrocarbon polymers which comprises heating and reacting carbon monoxide with hydrogen at a temperature of 150° to 275° C. under a pressure within the range of 400 to 5000 atmospheres and in contact with a metal phosphomolybdate represented by the formula $M_yP_2Mo_{20-26}O_{37-65}$, wherein M is a metal of group I of the periodic table and $y$ is an integer from 2 through 10.

5. A process for preparing normally solid, high molecular weight, hydrocarbon polymers which comprises heating and reacting carbon monoxide with hydrogen at a temperature of 125° to 350° C. under a pressure of at least 200 atmospheres and in contact with a nickel phosphomolybdate represented by the formula $$Ni_2 \cdot P_2O_5 \cdot (Mo_2O_5)_{11}$$

6. A process for preparing normally solid, high molecular weight, hydrocarbon polymers which comprises heating and reacting carbon monoxide with hydrogen at a temperature of 125° to 350° C. under a pressure of at least 200 atmospheres and in contact with a cobalt phosphomolybdate represented by the formula $$Co_3 \cdot P_2O_5 \cdot (Mo_2O_5)_{11}$$

7. A process for preparing normally solid, high molecular weight, hydrocarbon polymers which comprises heating and reacting carbon monoxide with hydrogen at a temperature of 125° to 350° C. under a pressure of at least 200 atmospheres and in contact with an iron phosphomolybdate represented by the formula $$Fe_3 \cdot P_2O_5 \cdot (Mo_2O_5)_{10}$$

8. A process for preparing normally solid, high molecular weight, hydrocarbon polymers which comprises heating and reacting carbon monoxide with hydrogen at a temperature of 125° to 350° C. under a pressure of at least 200 atmospheres and in contact with a copper phosphomolybdate represented by the formula $$Cu_3 \cdot P_2O_5 \cdot (Mo_2O_4)_{12}$$

9. A process for preparing normally solid, high molecular weight, hydrocarbon polymers which comprises heating and reacting carbon monoxide with hydrogen at a temperature of 125° to 350° C. under a pressure of at least 200 atmospheres and in contact with a zinc phosphomolybdate represented by the formula $$Zn_3 \cdot P_2O_5 \cdot (Mo_2O_3)_{12}$$

10. A process for preparing normally solid, high molecular weight, hydrocarbon polymers which comprises heating and reacting carbon monoxide with hydrogen at a temperature of 125° to 350° C. under a pressure of at least 200 atmospheres and in contact with a metal phosphomolybdate represented by the formula $$M_yP_2Mo_{20-26}O_{37-65}$$

wherein M is nickel and y is an integer from 2 through 10.

11. A process for preparing normally solid, high molecular weight, hydrocarbon polymers which comprises heating and reacting carbon monoxide with hydrogen at a temperature of 125 to 350° C. under a pressure of at least 200 atmospheres and in contact with a metal phosphomolybdate represented by the formula $$M_yP_2Mo_{20-26}O_{37-65}$$

wherein M is cobalt and y is an integer from 2 through 10.

12. A process for preparing normally solid, high molecular weight, hydrocarbon polymers which comprises heating and reacting carbon monoxide with hydrogen at a temperature of 125 to 350° C. under a pressure of at least 200 atmospheres and in contact with a metal phosphomolybdate represented by the formula $$M_yP_2Mo_{20-26}O_{37-65}$$

wherein M is iron and y is an integer from 2 through 10.

13. A process for preparing normally solid, high molecular weight, hydrocarbon polymers which comprises heating and reacting carbon monoxide with hydrogen at a temperature of 125 to 350° C. under a pressure of at least 200 atmospheres and in contact with a metal phosphomolybdate represented by the formula $$M_yP_2Mo_{20-26}O_{37-65}$$

wherein M is copper and y is an integer from 2 through 10.

14. A process for preparing normally solid, high molecular weight, hydrocarbon polymers which comprises heating and reacting carbon monoxide with hydrogen at a temperature of 125 to 350° C. under a pressure of at least 200 atmospheres and in contact with a metal phosphomolybdate represented by the formula $$M_yP_2Mo_{20-26}O_{37-65}$$

wherein M is zinc and y is an integer from 2 through 10.

References Cited in the file of this patent

UNITED STATES PATENTS

| | | |
|---|---|---|
| 2,632,014 | Gresham | Mar. 17, 1953 |
| 2,652,372 | Farlow | Sept. 15, 1953 |
| 2,714,583 | Fawcett | Aug. 2, 1955 |

U. S. DEPARTMENT OF COMMERCE
PATENT OFFICE

CERTIFICATE OF CORRECTION

Patent No. 2,825,705    Herrick R. Arnold et al.    March 4, 1958

It is hereby certified that error appears in the printed specification of the above numbered patent requiring correction and that the said Letters Patent should read as corrected below.

Column 3, line 6, for "$Ni_2 \cdot P_2O_2 \cdot (Mo_2O_5)_{11}$," read --$Ni_2 \cdot P_2O_5 \cdot (Mo_2O_5)_{11}$,--; column 4, line 18, in the table, first column thereof, second item, for "$3FeO \cdot P_2O_5 \cdot 22MoO_3 : 56H_2O$" read --$3FeO \cdot P_2O_5 \cdot 22MoO_3 \cdot 56H_2O$--; column 5, line 34, after "silver" insert a comma.

Signed and sealed this 17th day of June 1958.

(SEAL)
Attest:
KARL H. AXLINE
Attesting Officer

ROBERT C. WATSON
Commissioner of Patents